June 15, 1954
H. VOGT
2,681,375
ELECTRODE FOR ELECTRIC BATTERIES AND
A PROCESS FOR PRODUCING THE SAME
Filed April 25, 1949
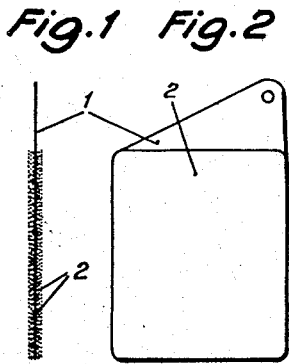
Fig.1  Fig.2
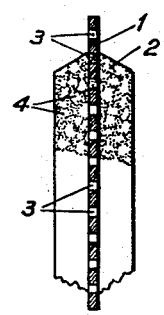
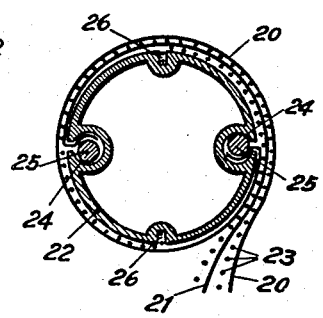
Fig.3   Fig.7
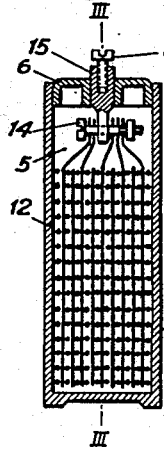
Fig.4
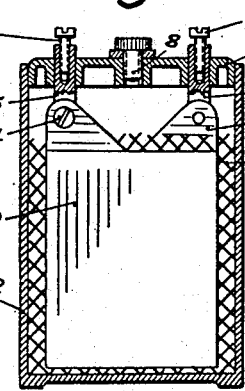
Fig.5
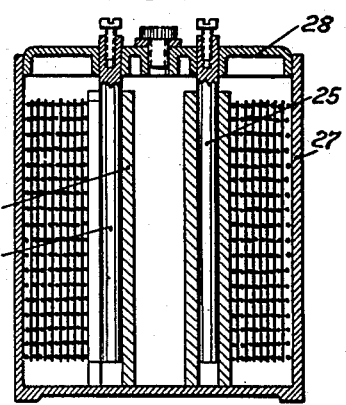
Fig.6
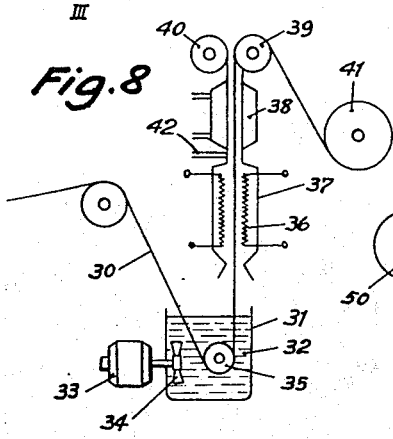
Fig.8
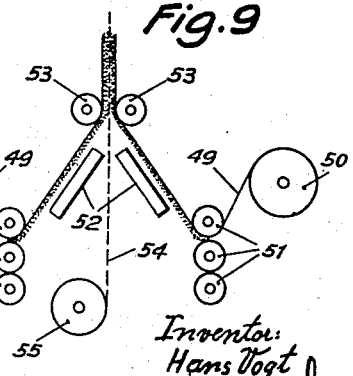
Fig.9
Inventor:
Hans Vogt
By K. A. Fauchen
Patent Agent

UNITED STATES PATENT OFFICE 2,681,375

ELECTRODE FOR ELECTRIC BATTERIES AND A PROCESS FOR PRODUCING THE SAME

Hans Vogt, Stockholm-Malarhojden, Sweden

Application April 25, 1949, Serial No. 89,416

Claims priority, application Sweden May 4, 1948

3 Claims. (Cl. 136—20)

This invention relates to an electrode for galvanic primary and secondary cells and storage batteries, more particularly, alkaline accumulators.

It is the object of the invention to provide an electrode of the type referred to which combines high efficiency, low resistance and low weight.

Another object of the invention is to provide a simple and cheap manufacturing process for such electrodes which facilitates the impregnation and filling of the electrodes.

With these and further objects in view which will hereinafter appear, the electrodes according to the present invention are made in the form of thin microporous metal sheets or foils by a process of powder metallurgy, and the active substances, more particularly the hydroxides, are incorporated in the pores thereof.

More particularly, the electrode consists at least partly of metal powder particles which are sintered together in the form of a thin foil the pores of which are filled with the active substances, more particularly, hydroxides. The microporous metal layers are preferably deposited by sintering on a thin carrier consisting of homogeneous or perforated metal foils, fine wire, gauze, or metal filaments which are felted. The thickness of the carrier foil appropriately amounts to about 0.02 to 0.05 mm. and the thickness of the complete electrode is less than 1 mm., preferably 0.2 to 0.8 mm.

According to a further feature of the invention, the weight of the electrode skeleton, i. e. the metal carrier plus metal powder sintered thereto, is approximately equal to the weight of the dry hydroxides incorporated in said skeleton. Preferably, metal powders of a low weight per unit volume, e. g. less than 1.5 grams per cm.$^3$, are used.

A preferred method of producing my novel electrode comprises the steps of preparing a suspension from light metal powders with additional substances promoting the formation of pores and suitable liquids, such as water, hydrocarbons and the like, depositing a thin layer of said suspension on the surfaces of the carrier foils, drying said suspension, and sintering said layer at temperatures between 600 and 1000° C. in a reducing atmosphere, for solidifying said layer in itself and on its carrier. According to one mode of carrying out the process, the substances incorporated in the deposited layer for promoting the formation of pores are removed therefrom before the sintering process. The light metal powders above referred to may be produced by the chemical or thermal decomposition of a metal salt at 400 to 500° C. and subsequent reduction at 600 to 800° C.

The metal powder suspension according to a preferred form of the manufacturing process may be applied to the carrier foil by a dip process. To this end, the carrier strip is passed in a continuous process through a metal powder suspension of a suitable consistence for forming on the surface of the carrier a layer of a thickness of some tenths of a millimeter, depending on the consistence of the suspension. The deposited layer is then dried, sintered and impregnated in subsequent steps of the continuous process. The carrier foil may be coated repeatedly to attain the desired thickness.

According to a further modification of my novel process, it comprises the steps of impregnating two paper strips with mineral substances, coating one side of each paper strip with the metal powder suspension, in a continuous process, preliminarily drying said strips, compressing said strips with an interposed extremely thin and light metal texture, completing the drying process and sintering the combined strips either in a continuous process or in the form of a pack or pile after cutting the strip to pieces of electrode size.

A plurality of electrodes produced in this manner may be combined with high porous textures of glass, artificial resin or lye-resisting synthetic fibres blotting or filterpaper, cellulose hydrate foil of about 0.1 to 0.3 mm. thickness interposed between the adjacent electrodes. The electrodes and the intermediate insulating layers may be designed in the form of strips and wound up spirally in the form of rolls, blocks or the like, and a plurality of pairs of electrode strips may be connected in parallel on a common roll.

Generally speaking, I produce my novel electrode by coating thin and light, preferably perforated metal foils, e. g., of nickel or iron of suitable thickness, e. g. 0.02 to 0.05 mm. or light wire gauze of thin wire, sintered metal filaments which are rolled into a flat form etc., with a metal powder suspension which is preferably produced of metal powders of a low specific gravity and a liquid, such as water or a hydrocarbon, adding an adhesive, if necessary. Where electrodes for an alkaline accumulator are to be made, light nickel or iron powders are used which may be produced from their salts, (e. g. from nitrate of nickel or nitrate of iron) at temperatures of 400 or 800° C., respectively, in an oxidizing and subsequently in a reducing atmosphere. Also it may be advantageous to add to this suspension spacing bodies adapted for the formation of pores as known in powder metallurgy, such as carbon particles, carbonate particles especially of carbonate of ammonium and the like which are removed from the electrode material before, during or after the sintering, thus producing a larger pore space. The suspension is advantageously applied by dipping, but equivalent methods such as spreading, spraying etc. may also be used. When the coating has dried on its base, the sheet is subjected to a heat treatment, in a reducing atmosphere, at temperatures between 600 and 1000° C. for a suitable length of time, by a stepwise or continuous treatment, whereby the particles are sintered together and to the base. Thus a ductile electrode skeleton is formed which is very suitable for the reception of the suitable hydroxides, e. g. of cadmium, nickel, iron or cobalt. Following this step the electrodes are impregnated in a manner known per se, appropriately by introducing the salts of said metals into the pores of the sheets and subsequent precipitation thereof with an alkali, whereby the electrochemically active hydroxides are produced which adhere firmly to the pores.

Further objects and features of the invention will be seen from the following detailed description in connection with the accompanying drawing showing by way of example and purely schematically some embodiments of the invention and in which:

Fig. 1 is a cross sectional view of an electrode embodying the invention, the thickness of the sheet being shown on an enlarged scale in proportion to the other dimensions, Fig. 2 is a side elevation of said electrode, Fig. 3 is a fragmentary cross sectional view of an electrode with a carrier in the form of a perforated foil, shown on a still larger scale;

Fig. 4 is a cross sectional view of an accumulator cell arrangement which may be provided with electrodes according to the invention;

Fig. 5 is a sectional view of the same cell, on line III—III of Fig 4;

Fig. 6 is a sectional view of an accumulator cell with wound electrodes;

Fig. 7 is a cross sectional view of the electrode system of Fig. 6, showing the electrodes as they are being wound up on a core.

Fig. 8 is a diagrammatic view showing an arrangement for coating the carrier strip with the metal powder layer in a continuous process.

Fig. 9 is a diagrammatic view showing an arrangement for uniting two coated strips with an interposed metal carrier strip.

Similar reference numerals denote similar parts in the different views.

Referring now to the drawing in greater detail, and first to Figs. 1 and 2, it will be seen that the electrode consists of a metal foil 1, e. g. of nickel or iron sheet material of a thickness of about 0.03 to 0.05 mm., said foil being homogeneous or perforated and having sintered thereon the microporous metal layer 2 whose hollow spaces are filled with the active hydroxides.

Fig. 3 shows such a structure on a larger scale, with a foil 1 having perforations 3. The section through the sintered layer 2 shows the individual metal particles which are sintered together, larger hollow spaces 4 being interspersed between the particles, said hollow spaces being produced by so-called spacing bodies, e. g. carbon particles or carbonates which are removed before, during or after the sintering. The proportion of hydroxide volume to metal weight can be substantially improved thereby.

The manufacture of such electrodes will now be described with reference to Figs. 8 and 9.

According to Fig. 8 the carrier strip 30 coming from a feed roller, not shown, passes over a roller 35 through a vessel 31 containing a suspension 32 of a suitable consistence composed of metal powder, spacing bodies, an adhesive and a solvent. The suspension 32 is continuously agitated by a stirring propeller 34 driven by a motor 33. The strip 30 slowly leaving the bath 32 is coated on both sides with a coating of a thickness of some tenths of millimeter. The strip then passes through a vertical furnace 37 provided with electric heating elements 36, in which the coating is dried and in which the spacing bodies may be removed. The strip now passes into a second furnace, not shown, in which the sintering is effected at about 600–1000° C. in reducing gases. The sintering operation is followed by a cooling operation by passage of the strip through a water-cooled jacket 38. Following this step the strip passes over tightening and driving rollers 39, 40 arranged so as to produce a nearly gas-tight seal. The sintered strip now gets to the reel 41 or into similar devices as known, e. g., from the technique of film development plants, and to further installations, not shown, in which the spacing bodies possibly still contained are removed by dissolving and the impregnation with the metal salts, the drying, precipitation, washing and renewed drying is effected, preferably in several consecutive stages.

According to Fig. 9 the electrodes are made in such a way that strips of glazed paper 49 are moved in the direction of the arrow from supply reels 50 over a roller device 51 whose ribbed lower roller is immersed in an iron powder suspension whereby the paper strips are coated on one side with the pasty or pulpy emulsion. By the heating bodies 52 the applied layer is appropriately and incompletely dried. The two coated strips pass between two rollers 53 by which they are compressed, a metal netting 54 being fed between the paper strips from supply reel 55, as indicated by the dotted lines. The strip continuously passing out on the upper side of the rollers is either further treated in the same manner as described with reference to Fig. 8 or horizontally guided by a guiding device, not shown, and automatically cut to pieces of suitable length, which are then piled up to form packets. These foil packets are sintered in furnaces with a reducing atmosphere, at a suitable temperature, e. g. at about 800° C., for 1 to 2 hours. The paper layers are burnt thereby, but the mineral glazing admixtures contained therein prevent the metal sheets from sintering together in such a way that these sheets are retained as individual thin electrodes which after superficial cleaning are subjected to the impregnating process.

My novel accumulator electrodes may be arranged in accumulator cells in a manner deviating from the conventional form. Figs. 4 and 5 show an accumulator cell comprising electrode foils in accordance with the present invention. This cell consists of a casing 5 with a cover 6 both of any suitable synthetic material, a contact screw 7 being threadedly engaged with post 15, and a feed hole for the lye, closed by a screw 8 with a resilient rubber packing. The electrodes 9 and 10 are separated from each other by porous glass wool or textile material or filterpaper cellulose hydrate foil 11 of about 0.1 to 0.3 mm. thickness which are resistant against lyes. In an assembled condition, the electrodes are slightly pressed together or pressed against the insulating layers 11, by the walls 12 of the casing. A screw 14 serves to compress the electrodes which are connected in parallel, with interposed spacing washers, if necessary, and connected with the lower part of their terminal post 15.

It is also contemplated within the purview of this invention, more particularly where the electrodes are made in the form of long strips as shown in Figs. 8 and 9, to wind up the electrodes in the form of round or flat bodies, e. g., similar to electrolytic condensers, providing means for allowing discharge of the gases produced during the charging operation. This design permits the production of particularly cheap cells and accumulators.

One form of an accumulator of this type is shown in Figs. 6 and 7. The electrode strips 20 and 21 as well as the insulating layers 23 are wound up on a former or core 22 of artificial resin material. The electrode strips are advantageously connected to the contact posts 25 in such a way that axially directed holes with slots 24 are pressed into the core 22 for threadable engagement therein of the posts 25 which are fixedly connected to the foil ends by jamming. This type of connection is perfectly sufficient where the intensity of the charging and discharging currents is not too high. Where it is intended to take from the accumulator currents of a higher intensity, it is advantageous to connect several foils in parallel by simultaneous compression in bore 24, or to provide them with metal contact strips in any other suitable manner. The starting ends of the insulating strips 23 are advantageously also engaged in the recesses 26 or secured on the former in any other manner or interposed and clamped. The whole unit is then held together by rubber straps or the like and accommodated in a casing 27 of artificial resin provided with a cover 28. It will be understood that it is also possible to make the wound accumulator in a much simpler form and in this form it may also serve as a substitute for the conventional Leclanché cells, having the advantage of being fit for recharging.

The resistance of an accumulator embodying electrodes in accordance with the invention is extremely low, i. e. about one tenth to one twentieth of that of the conventional sheet metal or sintered electrodes. Therefore, accumulators according to the invention can stand charging and discharging currents which may be a multiple of the maximum figures hitherto admissible. The efficiency is improved accordingly. The impregnation process which causes great difficulties with thick sintered electrodes can be carried out relatively easily and quickly with these thin layers. Complete filling of the cavities with the hydroxides is ensured.

Although it is not intended to give a final scientific theory for the high efficiency of my novel cell, it may be assumed that the extremely low internal resistance of a volumetric unit of the electrode material according to the present invention is mainly due to the following facts:

(1) The distance to be passed by the ions in order to reach the innermost parts of the electrode is about 10 times shorter than with the usual electrodes having a thickness of 2 to 4 mm.

(2) The volume of the hydroxide available for the conduction of the ions and surrounded by the microporous metal skeleton is about 85 to 90%.

(3) Owing to the small thickness of the electrodes the electrode surfaces opposing each other are a multiple of that of the conventional electrodes with equal electrode volume.

(4) Owing to the small thickness of the electrode almost the whole mass which is electro-chemically active takes part in the reduction and oxidation process simultaneously (rather than in temporal succession) and electro-chemical voltage potentials resulting temporally in the layer by electric loads are compensated within a short time by diffusion.

(5) The shape of my novel electrode which is similar to a foil or cardboard sheet permits the arrangement of cathode and anode with very small interspaces, whereby the passage of the current through the lye is considerably shortened.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An electrode arrangement including in combination at least one pair of strip-shaped electrodes each comprised of a thin carrier sheet having a thickness of between .02 and .05 mm., sintered metal powder particles adhering to said carrier sheet in the form of at least one thin porous layer, and an electro-chemically active substance embodied in the pores of said layer, the total thickness of each of said strip-shaped electrodes being less than 1 mm., and a permeable insulating strip of a lye-resistant material interposed between the adjacent electrodes, said electrodes being wound up spirally in the form of rolls.

2. An electrode for electro-chemical purposes comprising a metallic carrier sheet having a thickness of between 0.02 and 0.05 mm., sintered metal powder particles adhering to said carrier sheet in the form of a thin porous layer of such thickness that the total thickness of the electrode is less than 1 mm., and electro-chemically active substances contained in the pores of said layer.

3. An electrode for electro-chemical purposes comprising a thin metallic carrier sheet, sintered metal powder particles adhering to said carrier sheet in the form of a thin porous layer, and electro-chemically active substances contained in the pores of said layer, the total thickness of said porous layer being from 0.2 to 0.8 mm.

References Cited in the file of this patent

UNITED STATES PATENTS

| Number | Name | Date |
|---|---|---|
| 854,200 | Edison | May 21, 1907 |
| 880,957 | Aylesworth | Mar. 3, 1908 |
| 880,979 | Edison | Mar. 3, 1908 |
| 882,144 | Edison | Mar. 17, 1908 |
| 1,269,778 | Becker | June 18, 1918 |
| 2,126,737 | Comstock | Aug. 16, 1938 |
| 2,251,913 | Brennan | Aug. 12, 1941 |
| 2,309,018 | Shaw | Jan. 19, 1943 |
| 2,310,932 | Brennan et al. | Feb. 16, 1943 |
| 2,330,202 | Brennan | Sept. 28, 1943 |
| 2,422,045 | Ruben | June 10, 1947 |
| 2,444,914 | Brennan | July 13, 1948 |
| 2,610,220 | Brennan | Sept. 9, 1952 |